(12) United States Patent
Yamashita et al.

(10) Patent No.: US 9,451,190 B2
(45) Date of Patent: Sep. 20, 2016

(54) METHOD FOR DRIVING PHOTOELECTRIC CONVERSION DEVICE

(71) Applicant: CANON KABUSHIKI KAISHA, Tokyo (JP)

(72) Inventors: Yuichiro Yamashita, Hsinchu (TW); Yoshihito Harada, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/812,620

(22) Filed: Jul. 29, 2015

(65) Prior Publication Data

US 2016/0088247 A1    Mar. 24, 2016

Related U.S. Application Data

(63) Continuation of application No. 13/765,133, filed on Feb. 12, 2013, now Pat. No. 9,124,835.

(30) Foreign Application Priority Data

Feb. 17, 2012  (JP) .................................. 2012-033361

(51) Int. Cl.
| | | |
|---|---|---|
| *H04N 5/374* | (2011.01) | |
| *H04N 5/359* | (2011.01) | |
| *H04N 5/378* | (2011.01) | |
| *H04N 5/335* | (2011.01) | |
| *H04N 5/343* | (2011.01) | |
| *H04N 5/345* | (2011.01) | |

(52) U.S. Cl.
CPC .............. *H04N 5/374* (2013.01); *H04N 5/335* (2013.01); *H04N 5/343* (2013.01); *H04N 5/3452* (2013.01); *H04N 5/3591* (2013.01); *H04N 5/378* (2013.01)

(58) Field of Classification Search
CPC .... H04N 5/374; H04N 5/343; H04N 5/3591; H04N 5/3452; H04N 5/335; H04N 5/378
See application file for complete search history.

(56) References Cited

U.S. PATENT DOCUMENTS

| | | | | |
|---|---|---|---|---|
| 2009/0180014 A1* | 7/2009 | Noda | ................... | H04N 5/3452 348/308 |
| 2010/0321532 A1* | 12/2010 | Hashimoto | .......... | H04N 5/2351 348/234 |
| 2013/0044247 A1* | 2/2013 | Kawahito | .......... | H04N 5/35581 348/296 |

FOREIGN PATENT DOCUMENTS

| | | |
|---|---|---|
| JP | 2004111590 A | 4/2004 |
| JP | 2010-4175 A | 1/2010 |

\* cited by examiner

*Primary Examiner* — Twyler Haskins
*Assistant Examiner* — Padma Haliyur
(74) *Attorney, Agent, or Firm* — Canon USA, Inc. IP Division

(57) ABSTRACT

After accumulating electric charges in pixels in first, second, and third rows, signals are output from the pixels in the first and second rows in a first frame, and thereafter, after accumulating electric charges in the pixels in the first row without accumulating electric charges in the pixels in the second and third rows, signals are output from the pixels in the first and third rows in a second frame following the first frame. Furthermore, the photoelectric conversion units of the pixels in the second and third rows are reset by the resetting units included in the pixels in the second and third rows in the first frame.

6 Claims, 14 Drawing Sheets

NOP

TX

Read Out

METHOD FOR DRIVING PHOTOELECTRIC CONVERSION DEVICE

CROSS-REFERENCE TO RELATED APPLICATION

This application is a Continuation of U.S. application Ser. No. 13/765,133, filed Feb. 12, 2013, which claims priority from Japanese Patent Application No. 2012-033361 filed Feb. 17, 2012, which are hereby incorporated by reference herein in their entireties.

BACKGROUND OF THE INVENTION

1. Field of the Invention

One disclosed aspect of the embodiments relates to a photoelectric conversion device, a method for driving the photoelectric conversion device, and an image pickup system.

2. Description of the Related Art

General image pickup apparatuses such as digital still cameras and digital camcorders capture still images along with moving images.

Japanese Patent Laid-Open No. 2010-4175 discloses an image pickup apparatus having a mode for capturing still images along with moving images. In this mode, pixels in all rows in an imaging plane simultaneously perform accumulation operations. In the accumulation operations, electric charges generated in a certain period of time are accumulated in photoelectric conversion units of the pixels.

In a first frame, electric charges accumulated in the photoelectric conversion units are simultaneously transferred to charge holding units included in the individual pixels. In the first frame, assuming that n is an integer equal to or larger than 0, signals are read only from pixels in (5n+1)th row and (5n+2)th row. Thereafter, in a second frame following the first frame, the accumulation operations are simultaneously performed in all the pixels again. However, only electric charges accumulated in the photoelectric conversion units of the pixels in the (5n+1)th row are transferred from the photoelectric conversion units to the charge holding units. Thereafter, signals corresponding to the electric charges transferred to the charge holding units in the second frame are read from the pixels in the (5n+1)th row, and in addition, signals corresponding to the electric charges transferred to the charge holding units in the first frame are read from the pixels in (5n+3)th row. After a third frame onwards, operations the same as that of the second frame are performed. In this case, instead of the pixels in the (5n+3)th row, signals corresponding to the electric charges transferred to the charge holding units in the first frame are successively read from pixels in a (5n+4)th row and a 5n-th row.

Specifically, signals corresponding to the electric charges accumulated by the accumulation operations are read from the pixels in the (5n+1)th row for individual frames whereas signals are read from the pixels in the (5n+2)th, (5n+3)th, (5n+4)th, and 5n-th rows every four frames. In other words, four frames are required for reading signals corresponding to the accumulation operations in the first frame from all the pixels. A still image is configured using the signals corresponding to the accumulation operations in the first frame obtained as described above. As a result, a still image in which accumulation timings are highly synchronized may be obtained, and a moving image read in ⅕ density of the still image is updated at a speed four times higher than a speed of update of the still image.

In the technique disclosed in Japanese Patent Laid-Open No. 2010-4175, the pixels in (5n+3)th to 5n-th rows are not reset in the second to fourth frames. Therefore, in a period of time after the electric charges are transferred to the charge holding units of the pixels in the first frame and before signals are read in the second to fourth frames, if electric charges larger than saturation charge amounts of the photoelectric conversion units are generated in the pixels in the (5n+3)th to 5n-th rows, the electric charges may flow in the charge holding units included in the pixels in the (5n+3)th to 5n-th rows and adjacent pixels. When blooming occurs due to different accumulation timings or leakage of the charges generated in the pixels, quality of a resultant image is deteriorated.

SUMMARY OF THE INVENTION

One disclosed aspect of the embodiments provides a method for driving a photoelectric conversion device which includes a plurality of pixels arranged in a matrix. Each of the pixels includes a photoelectric conversion unit, a holding unit configured to hold electric charges, a transfer unit configured to transfer electric charges generated in the photoelectric conversion unit to the holding unit, and a resetting unit configured to reset the photoelectric conversion unit. The method includes outputting, after accumulating electric charges in pixels in first, second, and third rows in the matrix, signals from the pixels in the first and second rows in a first frame and outputting, after accumulating electric charges in the pixels in the first row without accumulating electric charges in the pixels in the second and third rows, signals from the pixels in the first and third rows in a second frame following the first frame, and resetting the photoelectric conversion units of the pixels in the second and third rows using the resetting units included in the pixels in the second and third rows in the first frame.

Further features of the disclosure will become apparent from the following description of exemplary embodiments with reference to the attached drawings.

DESCRIPTION OF THE EMBODIMENTS

First Embodiment

Figure 1:
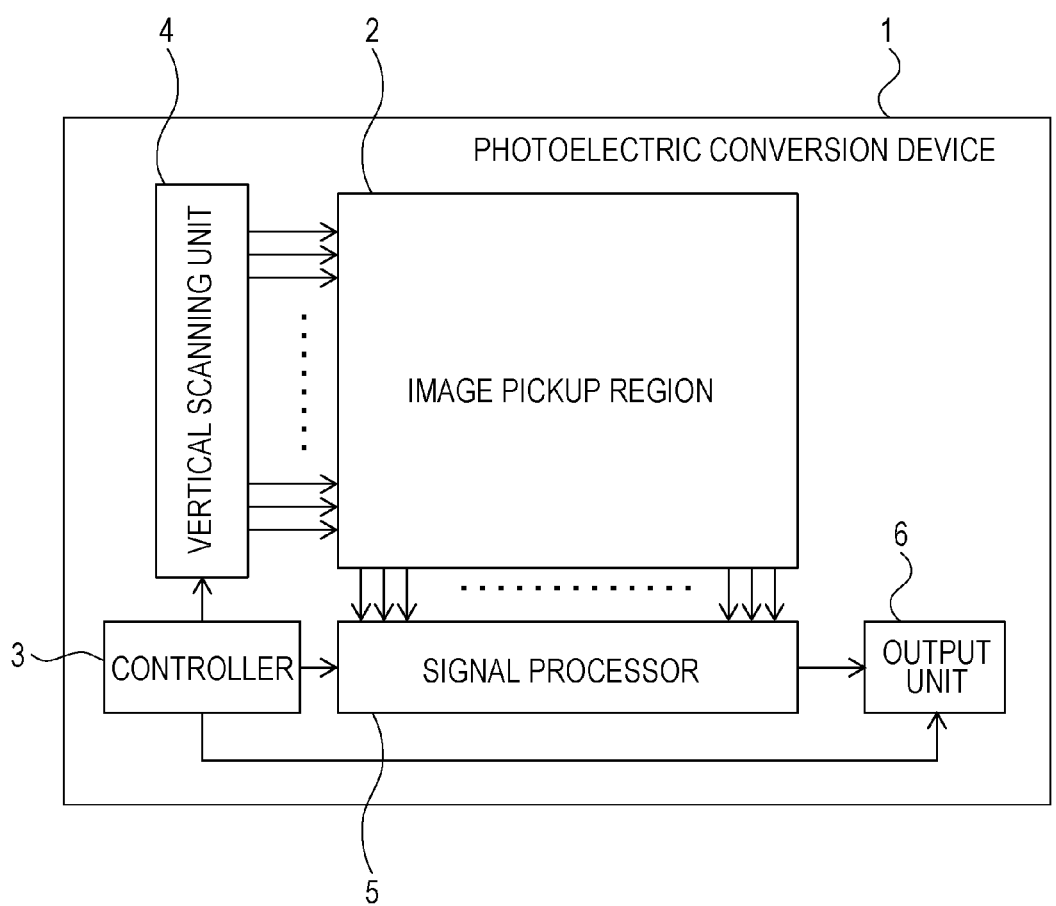
FIG. 1 is a block diagram illustrating a photoelectric conversion device according to a first embodiment.

A block diagram of an entire photoelectric conversion device which is applicable to the disclosure is illustrated in FIG. 1. A photoelectric conversion device 1 is configured by a single chip using a semiconductor substrate. The photoelectric conversion device 1 includes an image pickup region 2 including a plurality of pixels arranged therein. The photoelectric conversion device 1 further includes a controller 3. The controller 3 supplies control signals, power supply voltages, and the like to a vertical scanning unit 4, a signal processor 5, and an output unit 6.

The vertical scanning unit 4 supplies driving pulses to a plurality of pixels arranged in the image pickup region 2. The vertical scanning unit 4 normally supplies the driving pulses for individual pixel rows or in a unit of a plurality of pixel rows. The vertical scanning unit 4 may include a shift register or an address decoder.

The signal processor 5 includes a column circuit, a horizontal scanning circuit, and a horizontal output line. The column circuit includes a plurality of circuit blocks which receive signals of a plurality of pixels included in a pixel row selected by the vertical scanning unit 4. Each of the circuit blocks includes a signal holding unit, an amplifying circuit, a noise reduction circuit, or an analog/digital conversion circuit or includes a combination of the signal holding unit, the amplifying circuit, the noise reduction circuit, and the analog/digital conversion circuit. The horizontal scanning circuit may include a shift register or an address decoder.

The output unit 6 outputs signals supplied from the horizontal output line to outside of the photoelectric conversion device 1. The output unit 6 includes a buffer or an amplifying circuit.

Figure 2:
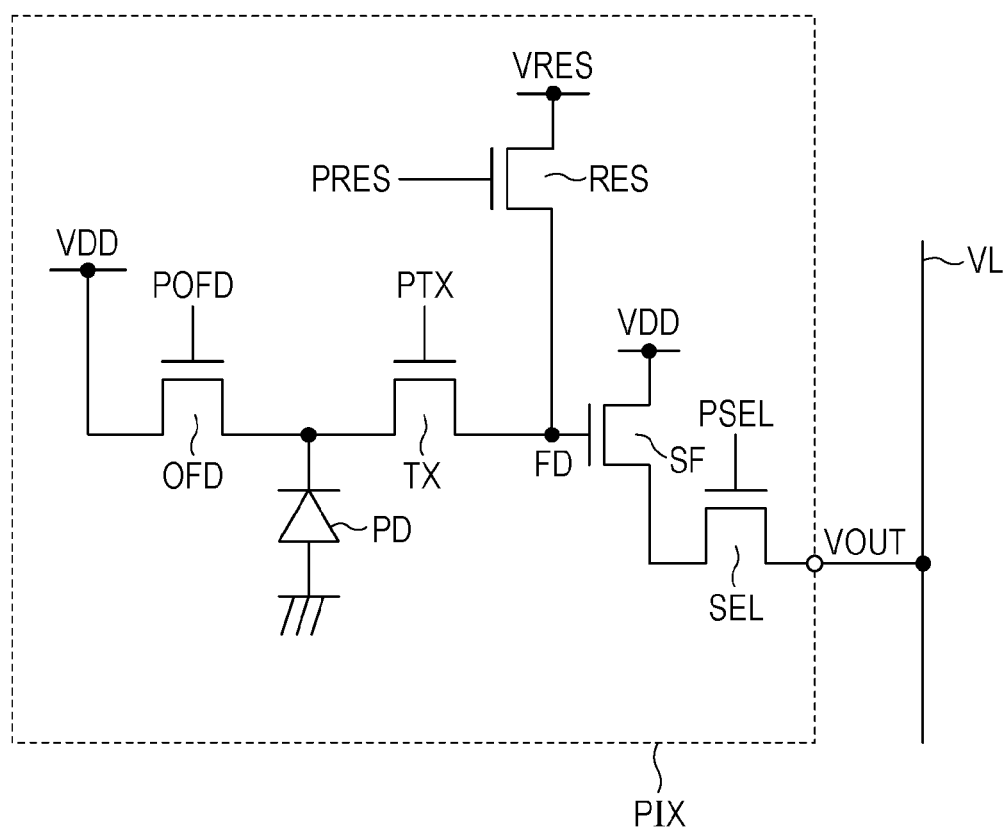
FIG. 2 is a diagram illustrating an equivalent circuit of a pixel according to the first embodiment.

Next, a configuration of each of the pixels included in the image pickup region 2 will be described with reference to FIG. 2. FIG. 2 is a diagram illustrating an equivalent circuit of a pixel PIX.

An anode of a photodiode PD serving as a photoelectric conversion unit is grounded in a fixed potential and a cathode of the photodiode PD is connected to a gate terminal of an amplifying transistor SF through a first transfer transistor TX serving as a first transfer unit. The cathode of the photoelectric conversion unit PD is further connected to a power source VDD functioning as an overflow drain (hereinafter referred to as an "OFD") through a second transfer transistor OFD serving as a second transfer unit. The second transfer transistor also functions as a resetting unit which resets the photoelectric conversion unit PD. The gate terminal of the amplifying transistor SF is connected to a power source VRES through a reset transistor RES. Furthermore, a node FD where the gate terminal of the amplifying transistor SF, a main electrode of the reset transistor RES, and a main electrode of the first transfer transistor TX are connected to one another in common includes a capacitance value and may hold electric charges. Hereinafter, capacitance included in the node FD is referred to as a "first holding unit" or simply referred to as a "holding unit". When the pixel PIX is formed on a semiconductor substrate, for example, the first holding unit is an impurity diffusion region which constitutes the main electrode of the first transfer transistor TX and the main electrode of the reset transistor RES and is also referred to as a "floating diffusion unit (FD unit)". Although the power source VDD and the power source VRES are separately configured in FIG. 2, they may be the same power source.

A selection transistor SEL has one main electrode connected to a vertical signal line VL and the other main electrode connected to one of main electrodes of the amplifying transistor SF. When an active signal PSEL is input to a control electrode, both of the main electrodes of the selection transistor SEL are brought to conductive states. Accordingly, the amplifying transistor SF forms a source follower circuit with a constant current source, not shown, provided in the vertical signal line VL, and a signal corresponding to a potential of the gate terminal which is a control electrode of the amplifying transistor SF is supplied to the vertical signal line VL. The photoelectric conversion device outputs a signal in accordance with the signal supplied to the vertical signal line VL and the signal is further supplied to the signal processor 5 and the like so as to be displayed as an image.

Figure 3:
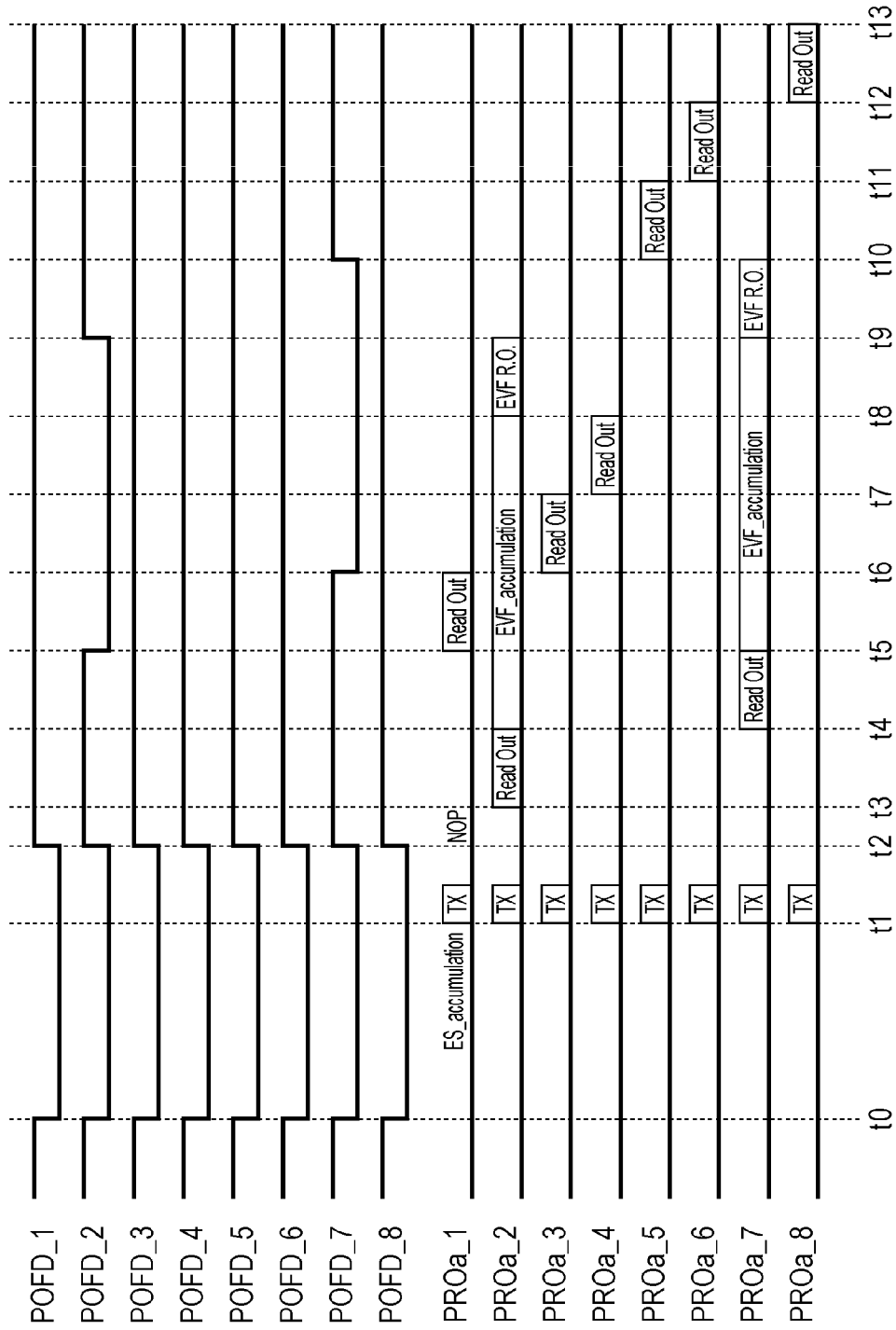
FIG. 3 is a diagram illustrating an operation sequence according to the first embodiment.

Next, an operation of this embodiment will be described. FIG. 3 is a diagram illustrating an entire operation sequence of the photoelectric conversion device 1. Here, pixels included in eight rows in the image pickup region are focused on.

In this embodiment, a cycle in which signals are read from pixels in second and seventh rows is shorter than a cycle in which signals are read from pixels in the other six rows.

In FIG. 3, POFD_n (n is an integer selected from 1 to 8) represents a signal POFD supplied to second transfer transistors OFD of pixels in an n-th row. It is assumed that, when the signal POFD_n is in a high level, second transfer transistors OFD in an n-th row are turned on. Furthermore, in FIG. 3, a signal group PROa_n (n is an integer selected from 1 to 8) represents an operation of the pixels in the n-th row. Here, a period ES_accumulation, a period TX, a period NOP, a period Read Out, a period EVF_accumulation, and a period EVF R.O. which are different periods from one another according to operations to be performed are illustrated. Note that horizontal scanning is omitted in FIG. 3.

Figure 4A:
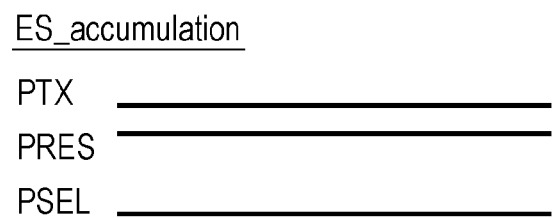
FIGS. 4A to 4F are diagrams illustrating timings according to the first embodiment.

Referring to FIGS. 4A to 4F, the operations in the periods will be described in detail. The period ES_accumulation illustrated in FIG. 4A represents a period of time in which electric charges are accumulated in photoelectric conversion units PD. Here, signals PTX and PSEL maintain low levels and a signal PRES maintains a high level. By this, the electric charges generated in the photoelectric conversion units PD are accumulated in photoelectric conversion units PD and FD units are reset. Furthermore, since the signal PSEL is in the low level, signals are not output from the pixels.

Figure 4B:
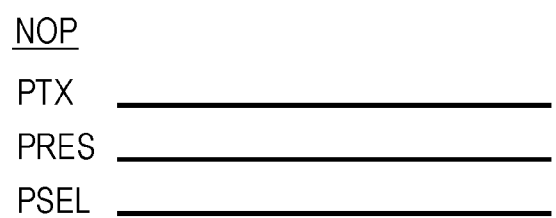

In the period NOP illustrated in FIG. 4B, the pixels do not operate and the signals PTX, PRES, and PSEL maintain low levels.

Figure 4C:
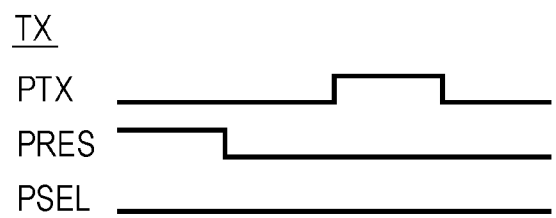

In the period TX illustrated in FIG. 4C, an operation of transferring the electric charges accumulated in the photoelectric conversion units PD to the first holding units is performed. First, the signal PRES is brought to a low level and the reset states of the FD units are cancelled. Thereafter, the signal PTX is brought to a high level so that the electric charges are transferred from the photoelectric conversion units PD to the first holding units. When the signal PTX is brought to a low level, accumulation periods are terminated.

Figure 4D:
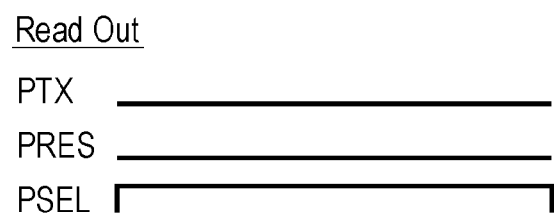

In the period Read Out illustrated in FIG. 4D, an operation of reading signals from the pixels is performed. In this period, the signals PTX and PRES are in low levels and the signal PSEL is in a high level, and therefore, signals corresponding to amounts of the electric charges held in the FD units are supplied to vertical signal lines VL.

Figure 4E:
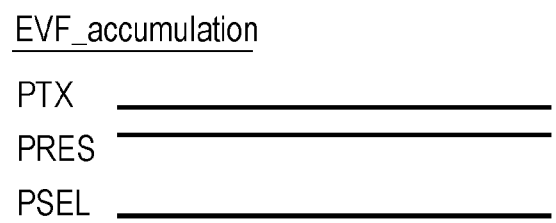

In the period EVF_accumulation illustrated in FIG. 4E, as with the period ES_accumulation, the photoelectric conversion units PD accumulate electric charges. The signals PTX and PSEL maintain low levels, the signal PRES maintains a high level, and the FD units are reset. Furthermore, since the signal PSEL is in the low level, signals are not output from the pixels.

Figure 4F:
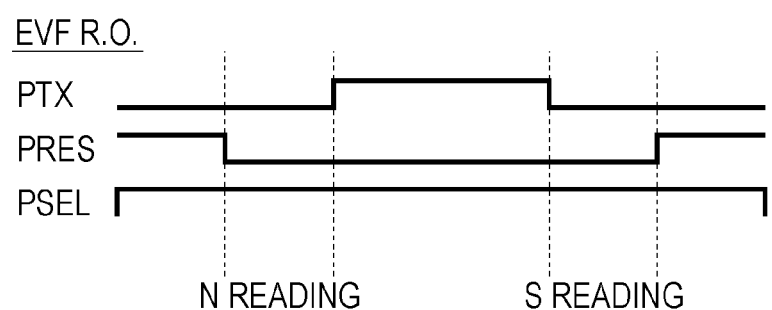

In the period EVF R.O. illustrated in FIG. 4F, signals are read from the pixels. In the period EVF R.O., the signal PSEL maintains a high level. First, in a state in which the signal PTX is in a low level, the signal PRES in a high level is shifted to a low level. By this, signals obtained by resetting the FD units are supplied to the vertical signal lines VL. The signals include fixed noise and random noise generated by reset transistors RES. Next, the signal PTX is brought to a high level so that the electric charges accumulated in the photoelectric conversion units PD are transferred to the FD units. By this, signals obtained in accordance with amounts of the electric charges obtained by the photoelectric conversion are supplied to the vertical signal lines VL. When the signal PTX is brought to a low level, the accumulation periods of the photoelectric conversion units PD are terminated. In FIG. 4F, since signals supplied to the vertical signal lines VL in a period represented by "N reading" and signals supplied to the vertical signal lines VL in a period represented by "S reading" include noise generated by the reset transistors RES, the noise may be reduced by obtaining differences between the signals.

FIG. 3 is now referred to again. At a time point t0, levels of the signals POFD_n are shifted from high levels to low levels in the pixels of all the rows. In this period, since the signal groups PROa_n are in the period ES_accumulation, when the signals POFD_n are brought to the low levels, the photoelectric conversion units PD allow accumulation of electric charges.

In a period of time in which the signals POFD_n are in the low level, at a time point t1, the signal groups PROa_n enter an operation in the period TX. The signal PRES which is in the high level in the period ES_accumulation is brought to a low level, and thereafter, the signal PTX is brought to a high level so that the electric charges are transferred from the photoelectric conversion units PD to the FD units. The foregoing operations are simultaneously performed in all the pixels in the eight rows.

After the period TX, the signal groups PROa_n enters the period NOP. In the period in which the signal groups PROa_n are in the NOP period, the signals POFD_n are brought to high levels at a time point t2. By this, the electric charges generated in the photoelectric conversion units PD are discharged to a power source VDD through the second transfer transistors OFD.

At a time point t3, a signal group PROa_2 enters the period Read Out. When the signal PSEL is brought to a high level in the pixels in the second row, signals corresponding to amounts of the electric charges transferred to the FD units in the period TX are supplied to the vertical signal lines VL. The signals are processed by the signal processor 5 and output to the outside of the photoelectric conversion device 1.

At a time point t4, the signal group PROa_2 enters the period EVF_accumulation and the signal group PROa_7 enters the period Read Out. By this, since the signal PSEL to be supplied to the pixels in the second row are brought to a low level and the signal PSEL to be supplied to the pixels in the seventh row are brought to a high level, signals supplied from the pixels in the seventh row are output to the outside of the photoelectric conversion device 1. The pixels in the seventh row enter the period EVF_accumulation after the period Read Out.

Thereafter, signals are read from the pixels in the first, third, and forth rows at time points t5, t6, and t7, respectively. Meanwhile, the operation of accumulating electric charges is performed in the pixels in the second and seventh rows.

By a time point t8, the signals are read from the pixels in the first to fourth rows and the seventh row. At this time point, a first frame reading operation is terminated.

At a time point t8, the signal group PROa_2 corresponding to the pixels in the second row enters the period EVF R.O. and signals are read from the pixels in the second row.

Next, at a time point t9, the signal group PROa_7 enters the period EVF R.O., and signals are read from the pixels in the seventh row.

Thereafter, signals are read from the pixels in the fifth, sixth, and eighth rows at time points t10, t11, and t12, respectively. Meanwhile, the operation of accumulating electric charges is performed in the pixels in the second and seventh rows. By a time point t13, the signals are read from the pixels in the second row and the fifth to eighth rows. At the time point t13, a second frame reading operation is terminated.

The same operation is performed on a third frame onwards after the second frame. Specifically, in the first frame in the two consecutive frames, the accumulating operations performed on the pixels in all the rows are simultaneously terminated (at a time point t1'), and signals are read from the pixels in the first to fourth rows and the seventh row in the first frame. Then, in the second frame, the accumulating operations are newly performed in the pixels in the second and seventh rows which are subjected to the reading in the first frame, and thereafter, signals are read from the pixels in the second row and the fifth to eighth rows. According to this operation, signals are read from the pixels in the second and seventh rows twice, and signals corresponding to the electric charges accumulated in the first frame are read from the pixels in the first, third, fourth, fifth, sixth, and eighth rows at two separate timings.

The signals read from the pixels in the first to fourth rows and the seventh row in the first frame and the signals read from the pixels in the fifth, sixth, and eighth rows in the second frame are synthesized with each other so that an image corresponding to the electric charges accumulated in the first frame is formed. Since the signals read from the second and seventh rows in the first and second frames are used, an image having a high updating speed and low resolution is formed.

For example, when the photoelectric conversion device 1 according to this embodiment is employed in a digital still camera, a moving image is formed using the signals read from the pixels in the second and seventh rows, and a still image is formed using the signals read from all the rows for a period of time corresponding to a plurality of frames. The moving image may be stored in a storage unit such as an external memory or may not be stored but only displayed in an electronic view finder (EVF).

According to this embodiment, since the signals POFD_n are set in the low levels in a period of time other than the period of time in which the electric charges are accumulated, a still image having high synchronism of the accumulation timings and a moving image having a high updating speed may be obtained in parallel while deterioration of image quality caused by excessive electric charges generated in the photoelectric conversion units PD is suppressed.

The embodiment described above is generalized as below. That is, when pixels in at least three rows exist, accumulating operations are performed in a certain period of time in the pixels in the first to third rows and signals are read from the pixels in the first and second rows in a first frame. Thereafter, in a second frame following the first frame, the accumulating operations are performed in the pixels in the first row and signals are read from the pixels in the first and third rows. Furthermore, a photoelectric conversion device resets photoelectric conversion units in a period of time other than the period of time in which the operations of accumulating electric charges are performed.

According to the operation described above, a still image having high synchronism of accumulation timings and a moving image having a high updating speed may be obtained in parallel while deterioration of image quality caused by excessive electric charges generated in the photoelectric conversion units PD is suppressed.

Second Embodiment

Figure 5:
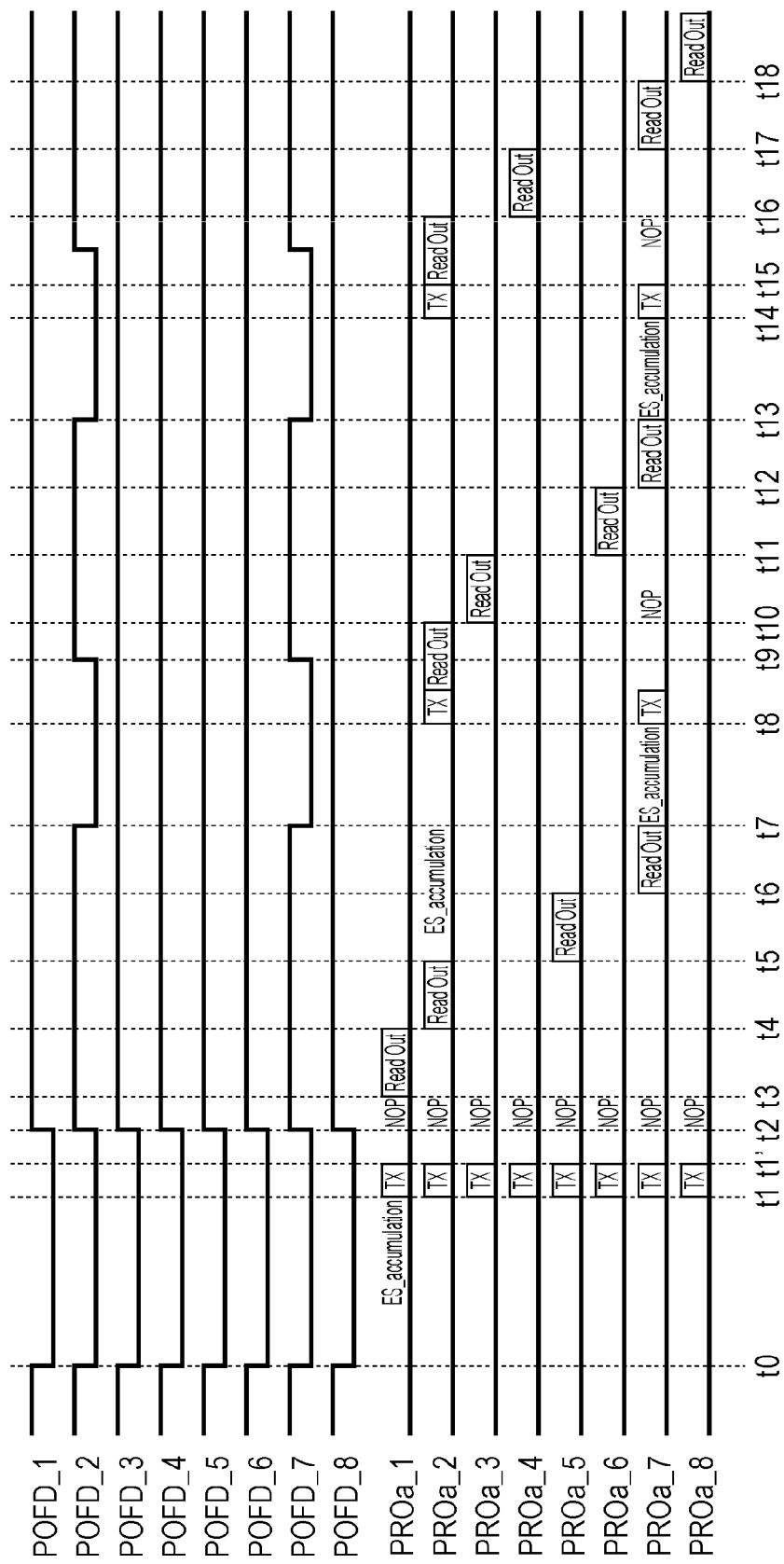
FIG. 5 is a diagram illustrating an operation sequence according to a second embodiment.

Referring now to FIG. 5, a second embodiment will be described. Portions of the second embodiment different from the first embodiment will be mainly described.

Although signals are read from the pixels in the eight rows in two frames in the first embodiment, signals are read in three frames in the second embodiment. Since the number of pixels read in one frame is reduced, a speed of update of pixels included in rows which are read every frame (second and seventh rows) is improved.

Furthermore, in the first embodiment, after signals are read from the pixels in the second and seventh rows in each frame, signals are read from the pixels in the other rows. On the other hand, in the second embodiment, signals are successively read from pixels included in rows in ascending order of the rows. According to the second embodiment, a vertical scanning unit 4 may select a row from which signals are to be read by performing scanning only once in each frame.

According to the second embodiment, accumulation periods of pixels in second and seventh rows are the same as each other in second and third frames (a period of time between time points t7 to t9 in FIG. 5). By this, according to this embodiment, in addition to the effect obtained in the first embodiment, synchronism of accumulation in an imaging plane may be improved even in an image having a high updating speed.

Third Embodiment

A third embodiment will now be described.

Figure 6:
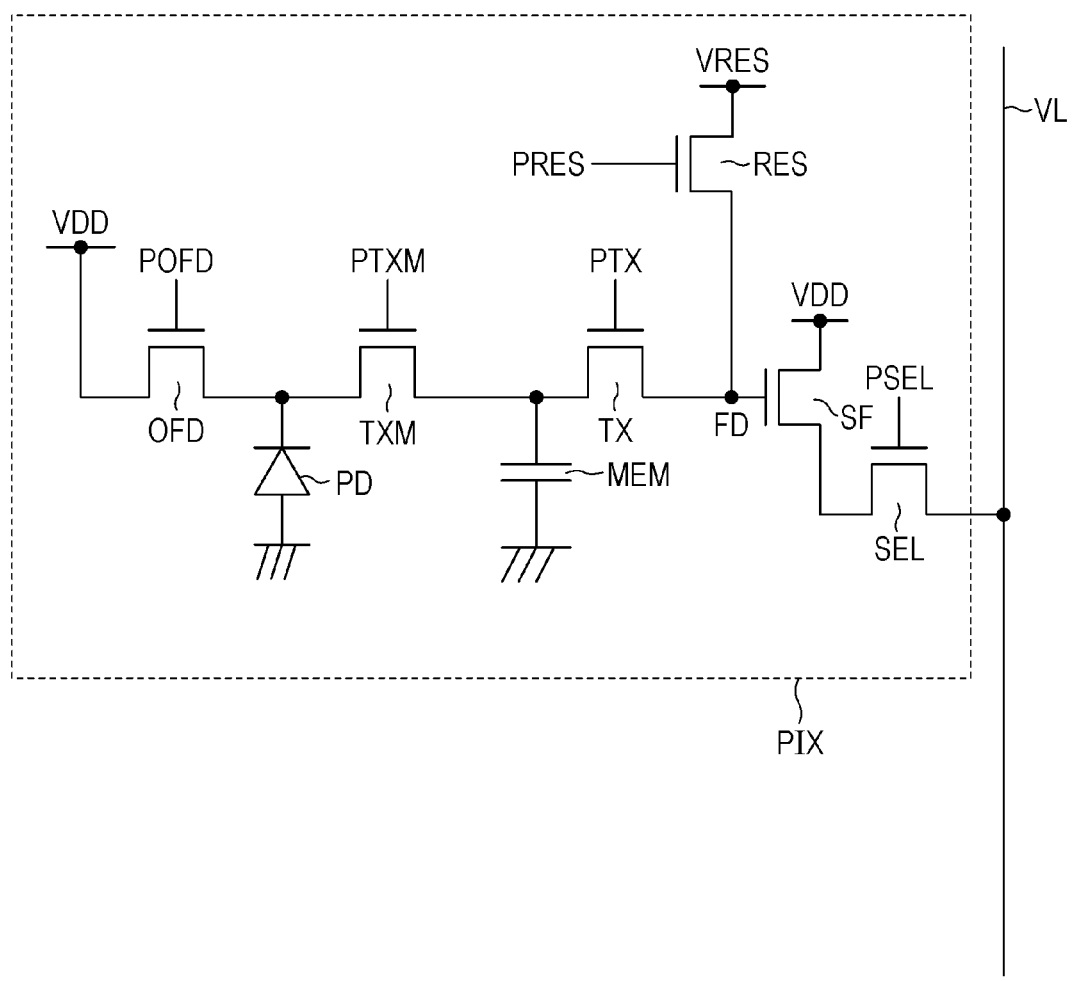
FIG. 6 is a diagram illustrating an equivalent circuit of a pixel according to a third embodiment.

FIG. 6 is a diagram illustrating an equivalent circuit of a pixel PIX of this embodiment. The pixel PIX of this embodiment is different from the pixel PIX of the first embodiment in that a storage capacitor MEM is provided between a photoelectric conversion unit PD and an FD unit.

In this embodiment, a transfer transistor TXM serves as a first transfer unit and the storage capacitor MEM serves as a first holding unit. The transfer transistor TXM is controlled by a signal PTXM.

Figure 7:
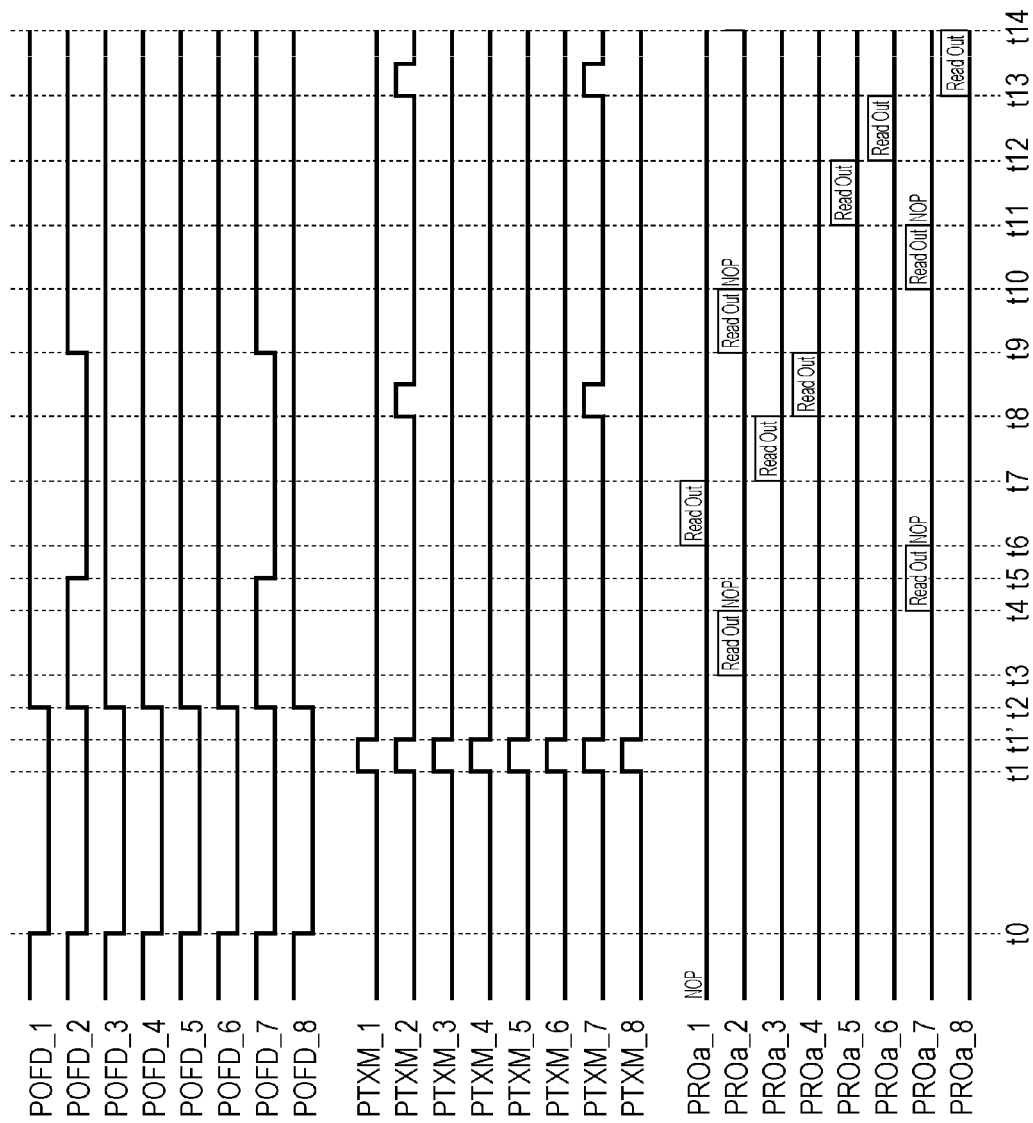
FIG. 7 is a diagram illustrating an operation sequence according to the third embodiment.

Next, an operation of this embodiment will be described. FIG. 7 is a diagram illustrating an entire operation sequence of a photoelectric conversion device 1 of this embodiment. In addition to the signals POFD_n and the signal groups PROa_n of the first embodiment, signals PTXM_n which control the transfer transistors TXM are illustrated. It is assumed that, when a signal PTXM_n is in a high level, transfer transistors TXM corresponding to pixels in an n-th row are turned on. Different names are assigned to different periods according to states of signal groups PROa_n. Operations in a period NOP and a period Read Out are different from those of the first embodiment.

Figure 8A:
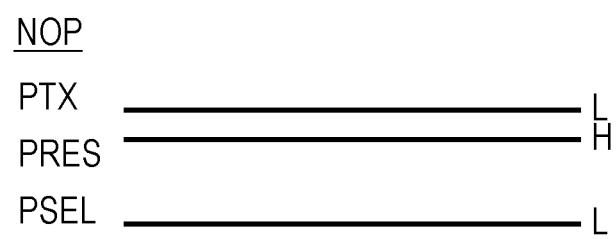
FIGS. 8A and 8B are diagrams illustrating timings according to the third embodiment.

The signal groups PROa_n in the period NOP of this embodiment are described in detail in FIG. 8A. In this embodiment, unlike the first embodiment, a signal PRES maintains a high level.

Figure 8B:
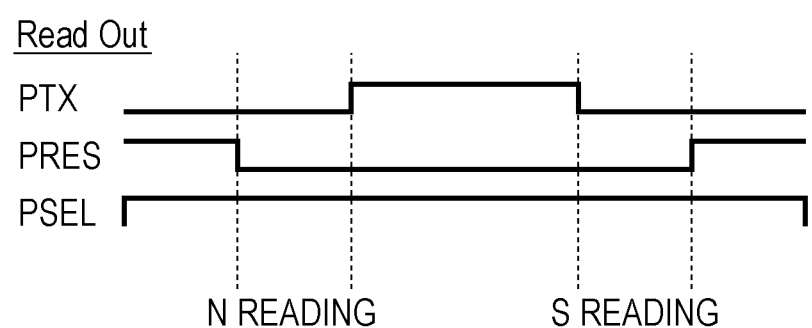

The signal groups PROa_n in the period Read Out of this embodiment is described in detail in FIG. 8B. The signal groups PROa_n in the period Read Out of this embodiment are shifted similarly to those in the period EVF R.O. of the first embodiment.

FIG. 7 is now referred to again. Also in this embodiment, signals are read from pixels in second and seventh rows every frame, and therefore, an updating speed is high. However, signals are read from pixels in the other rows for a plurality of frames, and therefore, an updating speed is low.

At a time point t0, levels of the signals POFD_n are shifted from high levels to low levels. In this period, the signals PTXM_n are in low levels and the signal groups PROa_n are in the period NOP. Specifically, at the time point t0, photoelectric conversion units PD of pixels in all the rows allow accumulation of electric charges.

When the signals PTXM_n are in high levels for a period of time from a time point t1 to a time point t1', the electric charges accumulated in the photoelectric conversion units PD are transferred to storage capacitors MEM serving as first holding units. The accumulation periods are terminated at the time point t1'.

At a time point t2, the signals POFD_n are brought to high levels and the photoelectric conversion units PD of the pixels in all the rows are reset.

At a time point t3, a signal group PROa_2 enters the period Read Out. When a signal PSEL is brought to a high level in the pixels in the second row, signals corresponding to amounts of the electric charges transferred to the storage capacitors MEM are supplied to vertical signal lines VL. The signals are processed by the signal processor 5 and output to outside of the photoelectric conversion device 1.

At a time point t4, the signal group PROa_2 enters the period NOP and a signal group PROa_7 enters the period Read Out. By this, the signal PSEL to be supplied to the pixels in the second row is brought to a low level and the signal PSEL to be supplied to pixels in the seventh row is brought to a high level, and accordingly, signals supplied from the pixels in the seventh row are output to the outside of the photoelectric conversion device 1. The pixels in the seventh row enter the period NOP after the period Read Out.

When the signals POFD_2 and POFD_7 are brought to low levels at a time point t5, the pixels in the second and seventh rows accumulate electric charges again. A timing when the signals POFD_2 and POFD_7 are brought to the low levels is not limited to the timing described herein, and the signals POFD_2 and POFD_7 may be brought to the low levels at any timing after the time point t1'. This is because the pixel PIX has the storage capacitor MEM.

Thereafter, signals are read from the pixels in the first, third, and forth rows at time points t6, t7, and t8, respectively. Meanwhile, the operations of accumulating electric charges are performed in the pixels in the second and seventh rows.

The operation of reading signals from the pixels in the fourth row is started at the time point t8, and in addition, the signals PTXM_2 and PTXM_7 are brought to high levels and electric charges accumulated in the photoelectric conversion units PD in a period started from the time point t5 are transferred to the storage capacitors MEM.

At a time point t9, a first frame reading operation is terminated, and thereafter, an operation in a second frame is entered.

A period of time from the time point t9 to a time point t14 corresponds to the second frame, and the operation performed in a period of time from the time point t2 to the time point t9 in the first frame is performed again in the second frame. Note that, in the second frame, signals are read from pixels in fifth, sixth, and eighth rows instead of the pixels in the first, third, and fourth rows.

After the time point t14, the operation starting from the time point t0 is performed again.

According to this embodiment, as with the first embodiment, since the signals POFD_n are set in the low levels in a period of time other than the period of time in which the electric charges are accumulated, a still image having high synchronism of accumulation timings and a moving image having a high updating speed may be obtained in parallel while deterioration of image quality caused by excessive electric charges generated in the photoelectric conversion units PD is suppressed.

Furthermore, according to this embodiment, when signals are read from the pixels included in the individual rows, signals having noise components which have correlation with one another may be read. Accordingly, noise may be further reduced.

Also in this embodiment, as with the second embodiment, signals may be read from the pixels included in the individual rows in ascending order of the rows.

Fourth Embodiment

A fourth embodiment will now be described.

Figure 9:
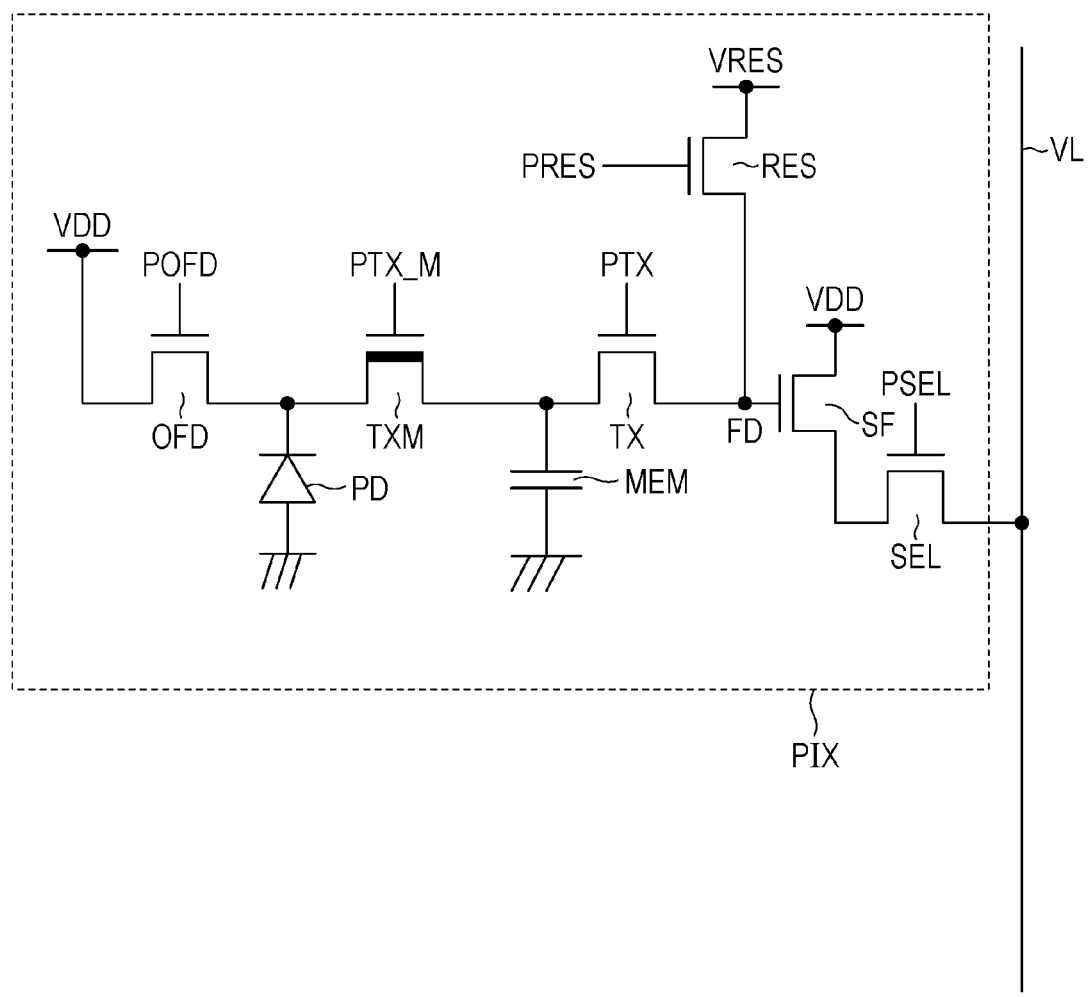
FIG. 9 is a diagram illustrating an equivalent circuit of a pixel according to a fourth embodiment.

FIG. 9 is a diagram illustrating an equivalent circuit of a pixel PIX according to the fourth embodiment.

An anode of a photodiode PD serving as a photoelectric conversion unit is grounded in a fixed potential and a cathode of the photodiode PD is connected to a first terminal of a storage capacitor MEM through a first transfer transistor TXM serving as a first transfer unit. The cathode of the photodiode PD is further connected to a power source VDD through a second transfer transistor OFD serving as a second transfer unit. A second terminal of the storage capacitor MEM is grounded in a fixed potential. The first terminal of the storage capacitor MEM is further connected to a gate terminal of an amplifying transistor SF through a third transfer transistor TX serving as a third transfer unit. The gate terminal of the amplifying transistor SF is connected to a power source VRES through a reset transistor RES. Although the power source VDD and the power source VRES are separately configured in FIG. 9, they may be the same power source.

A selection transistor SEL has one main electrode connected to a vertical signal line VL and the other main electrode connected to one of main electrodes of the amplifying transistor SF. When an active signal PSEL is input to a control electrode, the selection transistor SEL is turned on. Accordingly, the amplifying transistor SF forms a source follower circuit with a constant current source, not shown, connected to the vertical signal line VL, and a signal corresponding to a potential of the gate terminal, which is a control electrode, of the amplifying transistor SF is supplied to the vertical signal line VL. A photoelectric conversion device 1 outputs a signal in accordance with the signal supplied to the vertical signal line VL and the signal is further supplied to a signal processor 5 and the like so as to be displayed as an image. Furthermore, a node FD where the gate terminal of the amplifying transistor SF, a main electrode of the reset transistor RES, and a main electrode of a third transfer transistor TX are connected to one another in common has a capacitance value and may hold electric charges. When the pixel PIX is formed on a semiconductor substrate, the node FD includes an impurity diffusion region and is referred to as a floating diffusion unit (FD unit). Hereinafter, the node FD is referred to as an FD unit.

In this embodiment, the transfer transistor TXM serving as the first transfer unit is a buried channel type transistor. A concrete configuration of the pixel PIX and a potential will be illustrated in FIGS. 10A and 10B.

Components the same as those illustrated in FIG. 9 are denoted by reference characters the same as those illustrated in FIG. 9. Here, a case where electrons are used as signal charges is taken as an example for description of conductive types of semiconductor regions. When holes are used, conductive types opposite to those of the semiconductor regions are employed.

Figure 10A:
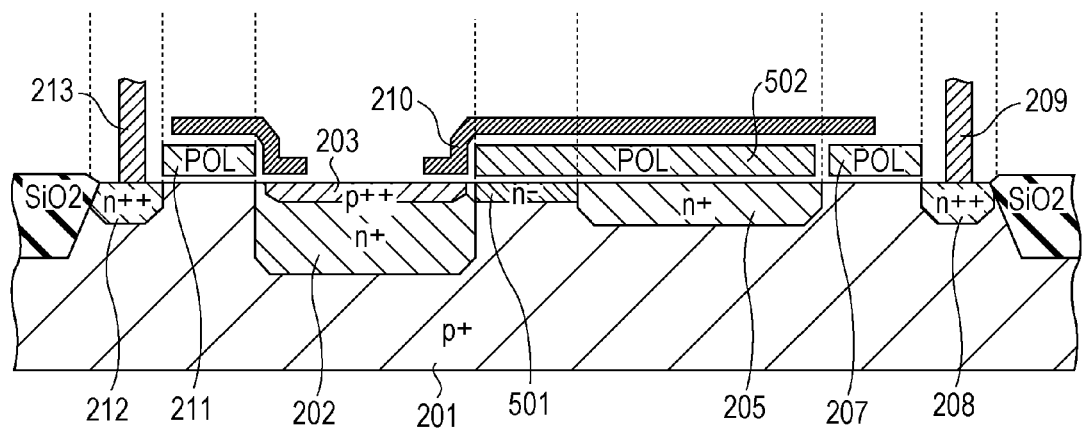
FIG. 10A is a sectional view of the pixel according to the fourth embodiment.

In FIG. 10A, a reference numeral 201 denotes a P-type semiconductor region. The P-type semiconductor region 201 may be formed by injecting P-type impurity ions in an N-type semiconductor substrate, or a P-type semiconductor substrate may be used as the P-type semiconductor region 201.

A reference numeral 202 denotes an N-type semiconductor region (first conductive type first semiconductor region) which is included in the photoelectric conversion unit PD. The N-type semiconductor region 202 has a polarity the same as that of electrons which are signal charges. The N-type semiconductor region 202 forms a PN junction with a portion of the P-type semiconductor region 201 (second conductive type second semiconductor region).

A reference numeral 203 is a P-type semiconductor region disposed on a surface of the N-type semiconductor region 202. The P-type semiconductor region 203 causes the photoelectric conversion unit PD to function as a buried type photodiode, reduces adverse effect of an interface state, and suppresses generation of dark current on a surface of the photoelectric conversion unit PD. The photoelectric conversion unit PD includes at least the first semiconductor region 202 and the second semiconductor region 201 which forms the PN junction with the first semiconductor region 202.

A reference numeral 207 denotes a third transfer electrode constituting the third transfer transistor TX. The third transfer electrode 207 may control a potential state between the storage capacitor MEM and the FD unit (a fourth semiconductor region described below) in accordance with a voltage supplied to the third transfer electrode 207. The third transfer electrode 207 is disposed on a second path located between third and fourth semiconductor regions described below through an insulating film.

A reference numeral 205 denotes an N-type semiconductor region (first conductive type third semiconductor region) which is included in the storage capacitor MEM. Electric charges transferred from the photoelectric conversion unit PD may be accumulated in the N-type semiconductor region for a predetermined period of time. A reference numeral 502 denotes a control electrode. The control electrode 502 is disposed on the third semiconductor region 205 through an insulating film and is capable of controlling a potential state of a region in the vicinity of a boundary of the insulating film in the third semiconductor region 205. Since a voltage is supplied to the control electrode 502 while the storage capacitor MEM holds the electric charges, the adverse effect of the dark current generated in the vicinity of a boundary of a surface oxide film in the N-type semiconductor region 205 is reduced. As described below, the supplied voltage is preferably a negative voltage so that the holes are collected in the boundary between the third semiconductor region 205 and the insulating film. For example, a voltage of approximately −3V is supplied. The voltage is appropriately changed in accordance with impurity concentration of the third semiconductor region 205.

The storage capacitor MEM includes the N-type semiconductor region 205 and the control electrode 502.

Figure 10B:
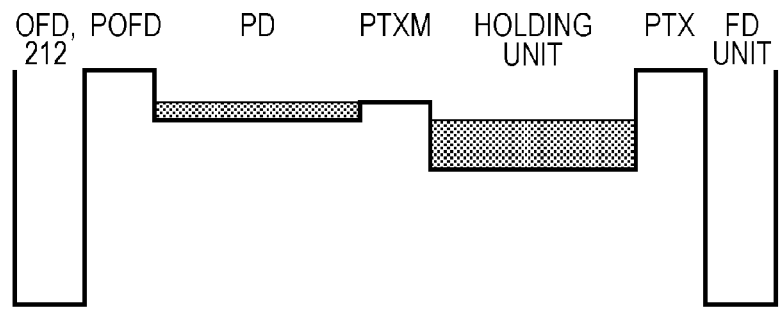
FIG. 10B is a diagram illustrating potential according to the fourth embodiment.

The control electrode 502 also serves as a first transfer electrode included in the first transfer transistor TXM. The first transfer electrode 502 is capable of controlling a potential state of a first path located between the photoelectric conversion unit PD and the storage capacitor MEM. A semiconductor region 501 having low density is disposed below the first transfer electrode 502 and between the N-type semiconductor region 202 and the N-type semiconductor region 205. With this configuration of the buried channel, the potential relationship illustrated in FIG. 10B is obtained.

A reference numeral 208 denotes a floating diffusion region (FD region) which corresponds to the FD unit illustrated in FIG. 9. The floating diffusion region 208 functions as a charge-voltage conversion unit. The floating diffusion region 208 is electrically connected to a gate of an amplifying MOS transistor through a plug 209 and the like.

A reference numeral 210 denotes a light shielding film. The light shielding film 210 is provided so that incident light does not enter the storage capacitor MEM. The light shielding film 210 preferably covers the storage capacitor MEM. However, as illustrated in FIG. 10A, the light shielding film 210 preferably extends to cover the entire first transfer electrode 502 and an upper portion of a portion of a second transfer electrode so that a light shielding function is further enhanced.

A reference numeral 211 denotes a control electrode for discharging electric charges which is included in the second transfer transistor OFD. The charge discharging control electrode 211 is capable of controlling a potential state of a third path located between the photoelectric conversion unit PD and the power source VDD. The charge discharging control electrode 211 is disposed on the third path through an insulating film. The charge discharging control electrode 211 controls a potential state so that a charge generated in the photoelectric conversion unit PD due to incident light is discharged to the power source VDD. An accumulation period (exposure period) of the photoelectric conversion unit PD may be controlled by a voltage supplied to the charge discharging control electrode 211.

A reference numeral 212 denotes a fifth semiconductor region. A reference numeral 213 denotes a plug used to supply a power source voltage to the fifth semiconductor region 212. The plug 213 is connected to the power source VDD, not shown. Specifically, the fifth semiconductor region 212 and the plug 215 are included in a second power source.

The first transfer transistor TXM includes the photoelectric conversion unit PD and the storage capacitor MEM. Furthermore, the second transfer transistor OFD includes the photoelectric conversion unit PD and the fifth semiconductor region 212. Moreover, the third transfer transistor TX includes the storage capacitor MEM and the FD unit.

The pixels PIX illustrated in FIGS. 9 and 10A are arranged in a matrix so as to form an image pickup region 2 of the photoelectric conversion device 1. A reset unit, an amplifying unit, and a selection unit of the pixel PIX may be shared by a plurality of photoelectric conversion units PD.

FIG. 10B is a potential diagram obtained when signals POFD, PTXM, and PTX in low levels are supplied to the pixel PIX having the configuration illustrated in FIG. 10A. In FIG. 10B, potentials relative to electrons become higher in a downward direction.

As described hereinabove, the first transfer unit TXM according to this embodiment includes a buried channel type transistor. Therefore, even when the signal PTXM is in the low level, a potential relative to electrons becomes higher than the second transfer unit OFD and the third transfer unit TX. In this state, when light is incident on the photoelectric conversion unit PD, generated electrons are accumulated in the photoelectric conversion unit PD. When an amount of the generated electrons exceeds a saturation charge amount of the photoelectric conversion unit PD, the electrons flow over a potential barrier formed in the transfer unit TXM into the storage capacitor MEM. FIG. 10B is a diagram illustrating this state. Gray regions represent the accumulated electrons.

Figure 11:
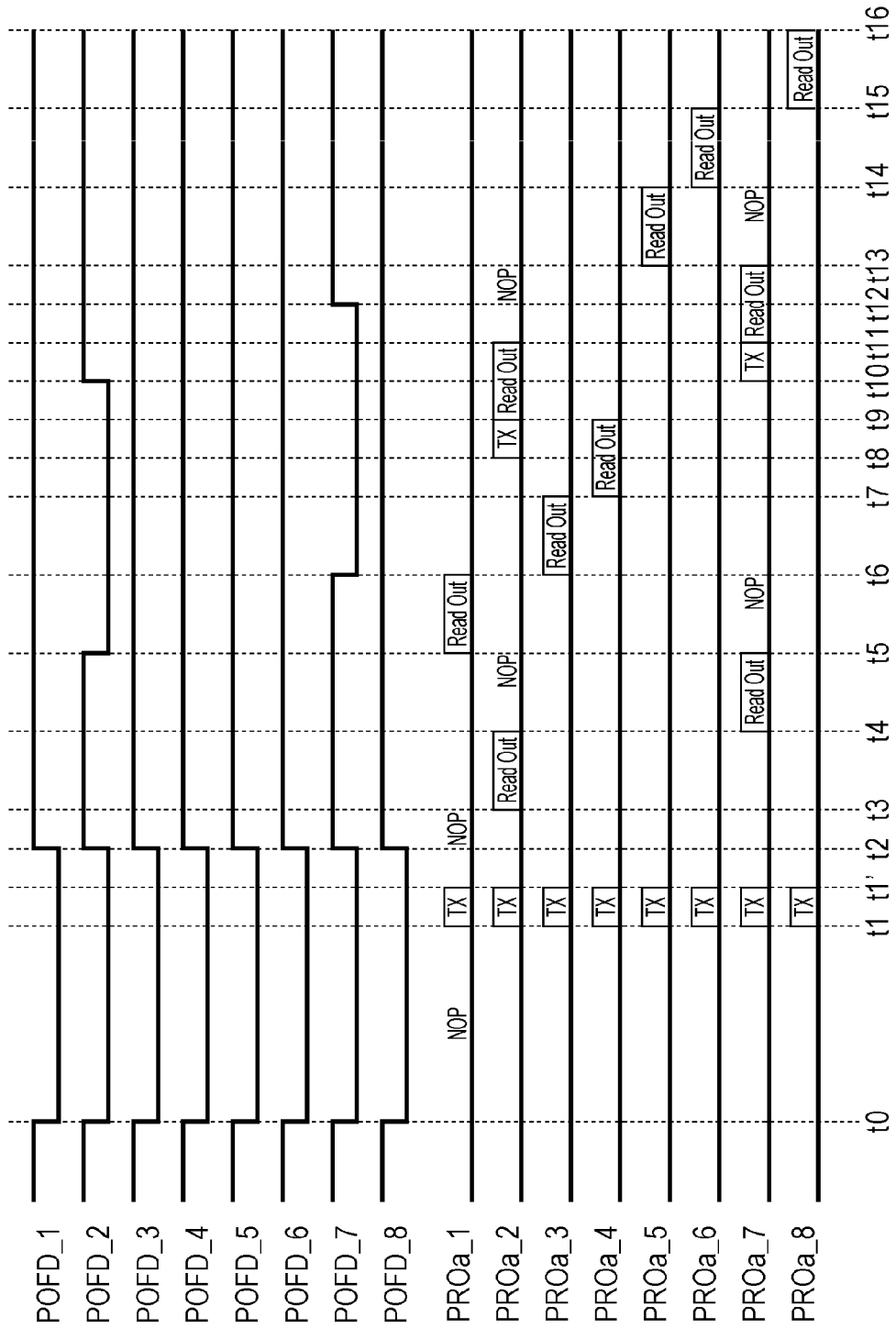
FIG. 11 is a diagram illustrating an operation sequence according to the fourth embodiment.

Next, an operation of this embodiment will be described. FIG. 11 is a diagram illustrating timings in an entire operation of this embodiment. Pixels in first to eighth rows in the image pickup region 2 are focused on. In this embodiment, a cycle in which signals are read from pixels in second and seventh rows is shorter than a cycle in which signals are read from pixels in the other six rows.

In FIG. 11, POFD_n (n is an integer selected from 1 to 8) represents a signal POFD supplied to second transfer transistors OFD of pixels in an n-th row. It is assumed that, when the signal POFD_n is in a high level, the second transfer transistors OFD in the n-th row are turned on. Furthermore, in FIG. 11, a signal group PROa_n (n is an integer selected from 1 to 8) represents an operation of the pixels in the n-th row. Here, a period NOP, a period TX, and a period Read Out which are different from one another according to operations to be performed are illustrated. Note that horizontal scanning is omitted in FIG. 11.

Figure 12A:
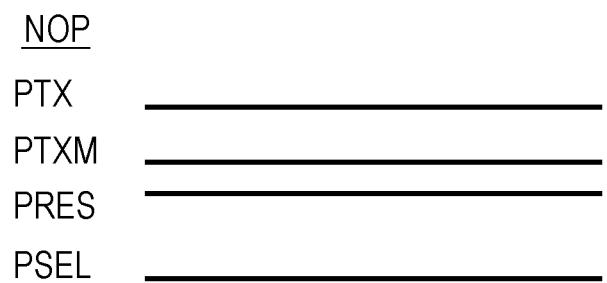
FIGS. 12A to 12C are diagrams illustrating timings according to the fourth embodiment.
Figure 12B:
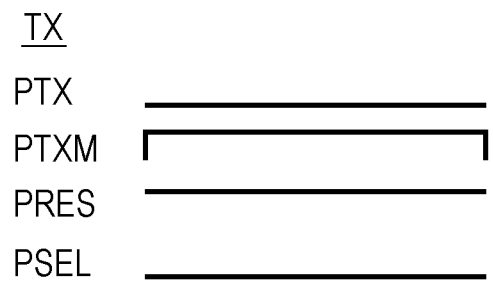
Figure 12C:
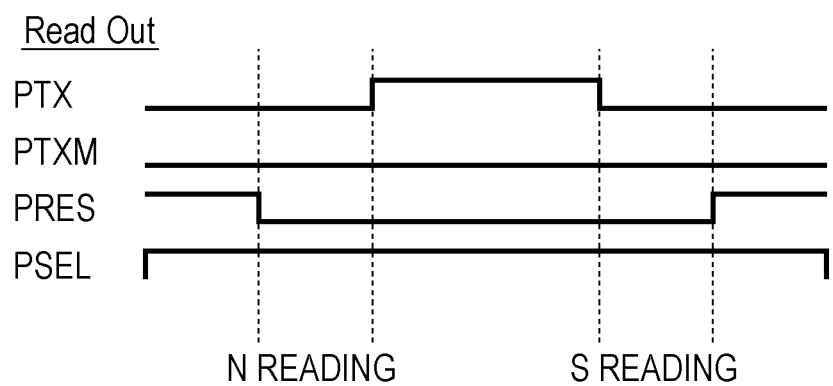

Referring to FIGS. 12A to 12C, operations in the various periods will be described in detail. In the period NOP illustrated in FIG. 12A, the pixels do not operate and the signals PTX, PTXM, and PSEL maintain low levels and the signal PRES maintains a high level. In this period, the FD units maintain reset states.

In the period TX illustrated in FIG. 12B, an operation of transferring electric charges accumulated in the photoelectric conversion units PD to the storage capacitors MEM is performed. Since the signal PTXM is brought to a high level, the electric charges are transferred from the photoelectric conversion units PD to the storage capacitors MEM.

In the period Read Out illustrated in FIG. 12C, an operation of reading signals from the pixels is performed. In this period, the signal PSEL is in a high level. First, the signal PRES is brought to a low level and the reset states of the FD units are cancelled. By this, signals obtained by resetting the FD units are supplied to the vertical signal lines VL. The signals include fixed noise and random noise generated by the reset transistors RES. Next, the signal PTX is brought to a high level so that the electric charges stored in the storage capacitors MEM are transferred to the FD units. By this, signals obtained in accordance with amounts of the electric charges obtained by the photoelectric conversion are supplied to the vertical signal lines VL. In FIG. 12C, since signals supplied to the vertical signal lines VL in a period represented by "N reading" and signals supplied to the vertical signal lines VL in a period represented by "S reading" include noise generated by the reset transistors RES, the noise may be reduced by obtaining differences between the signals.

FIG. 11 is now referred to again. At a time point t0, levels of the signals POFD_n are shifted from high levels to low levels in all the rows. In this period, since the signal groups PROa_n correspond to the period NOP, when the signals POFD_n are brought to the low levels, the photoelectric conversion units PD allow accumulation of electric charges. Here, states of potentials of the pixels PIX are represented by FIG. 10B. Specifically, a potential of the electric charges accumulated in the transfer unit TXM is higher than a potential of the electric charges accumulated in the second transfer unit OFD which is the second transfer unit relative to the electric charges accumulated in the photoelectric conversion unit PD. Furthermore, the potential in the transfer transistor TXM is lower than the potential in the photoelectric conversion unit PD. Accordingly, the saturation charge amount of the photoelectric conversion unit PD is determined in accordance with the potential of the first transfer transistor TXM. Therefore, in accumulation periods starting from the time point t0, when amounts of the generated electrons exceeds saturation charge amounts of the photoelectric conversion units PD, the electrons flow over the potential barriers of the first transfer units TXM into the storage capacitors MEM.

In a period of time in which the signals POFD_n are in the low levels, at a time point t1, the signal groups PROa_n enter an operation in the period TX. The signal PTXM which is in the low level in the period NOP is brought to a high level, and the electric charges accumulated in the photoelectric conversion units PD are transferred to storage capacitors MEM. The electric charges which flow over the potential barriers of the transfer transistors TXM into the storage capacitors MEM are added to the electric charges transferred to the storage capacitors MEM. The foregoing operations are simultaneously performed in all the pixels in all the rows.

When the period TX is terminated at a time point t1', the signal groups PROa_n enter the period NOP. In this state, when the signals POFD_n is brought to a high level at a time point t2, the FD units and the photoelectric conversion units PD are reset in a state in which all the pixels store electric charges in the storage capacitors MEM.

At a time point t3, the signal group PROa_2 enters the period Read Out. When the signal PRES is brought to a low level in the pixels in the second row, signals generated due to reset of the FD units are supplied to the vertical signal lines VL. Furthermore, when electric charges are transferred from the storage capacitors MEM to the FD units in accordance with the signal PTX, signals corresponding to amounts of the transferred electric charges are supplied to the vertical signal lines VL. The two types of signals are processed by the signal processor 5 and output to outside of the photoelectric conversion device 1.

At a time point t4, the signal group PROa_2 enters the period NOP again and the signal group PROa_7 enters the period Read Out. By this, since the signal PSEL to be supplied to the pixels in the second row are brought to a low level and the signal PSEL to be supplied to the pixels in the seventh row are brought to a high level, signals supplied from the pixels in the seventh row are output to the outside of the photoelectric conversion device 1. The pixels in the seventh row enter the period NOP after the period Read Out.

At a time point t5, the signal POFD_2 is brought to a low level and the photoelectric conversion units PD of the pixels in the second row allow accumulation of electric charges.

Thereafter, signals are read from the pixels in the first, third, and forth rows at time points t5, t6, and t7, respectively. At a time point t9 when the operation of reading the signals from the pixels in the fourth row is terminated, a first frame reading operation is terminated.

At a time point t6, the signal POFD_7 is brought to a low level and the photoelectric conversion units PD of the pixels in the seventh row allow accumulation of electric charges.

At a time point t8, the signal group PROa_2 enters the period TX, and the electric charges accumulated in the photoelectric conversion units PD from the time point t5 are transferred to the storage capacitors MEM.

In a reading operation in the second frame starting at the time point t9, first, the signal group PROa_2 enters the period Read Out so that signals are read from the pixels in the second row.

At a time point t10, the signal group PROa_7 enters the period TX, and the electric charges accumulated in the photoelectric conversion units PD from the time point t6 are transferred to the storage capacitors MEM. Furthermore, at the time point t10, the signal POFD_2 is brought to a high level and the photoelectric conversion units PD of the pixels in the second row are reset.

At a time point t11, the signal group PROa_7 enters the period Read Out and signals are read from the pixels in the seventh row.

At a time point t12, the signal POFD_7 is brought to a high level and the photoelectric conversion units PD of the pixels in the seventh row are reset.

Thereafter, signals are read from the pixels in the fifth, sixth, and eighth rows at time points t13, t14, and t15, respectively. At a time point t16 when the operation of reading the signals from the pixels in the eighth row is terminated, a second frame reading operation is terminated.

The same operation is performed on a third frame onwards after the second frame. Specifically, in the first frame in two consecutive frames, the accumulating operations performed on the pixels in all the rows are simultaneously terminated (at the time point t1'), and signals are read from the pixels in the first to fourth rows and the seventh row in the first frame. Then, in the second frame, the accumulating operations are newly performed in the pixels in the second and seventh rows which are subjected to the reading in the first frame, and thereafter, signals are read from the pixels in the second row and the fifth to eighth rows. According to this operation, signals are read from the pixels in the second and seventh rows twice whereas signals corresponding to electric charges accumulated in the first frame are read from the pixels in the first row, the third to sixth rows, and the eighth row at two separate timings.

The signals read from the pixels in the first to fourth rows and the seventh row in the first frame and the signals read from the pixels in the fifth, sixth, and eighth rows in the second frame are synthesized with one another so that an image corresponding to the electric charges accumulated in the first frame is formed. Using the signals read from the second and seventh rows in the first and second frames, an image having high updating speed and low resolution is formed.

For example, when the photoelectric conversion device 1 according to this embodiment is employed in a digital still camera, a moving image is formed using the signals read from the pixels in the second and seventh rows, and a still image is formed using the signals read from all the rows for a period of time corresponding to a plurality of frames.

According to this embodiment, since the signals POFD_n are set in the low levels in a period of time other than the period of time in which the electric charges are accumulated, a still image having high synchronism of accumulation timings and a moving image having a high updating speed may be obtained in parallel while deterioration of image quality caused by excessive electric charges generated in the photoelectric conversion units PD is suppressed.

Also in this embodiment, the operation performed in the second embodiment may be performed.

Fifth Embodiment

Figure 13:
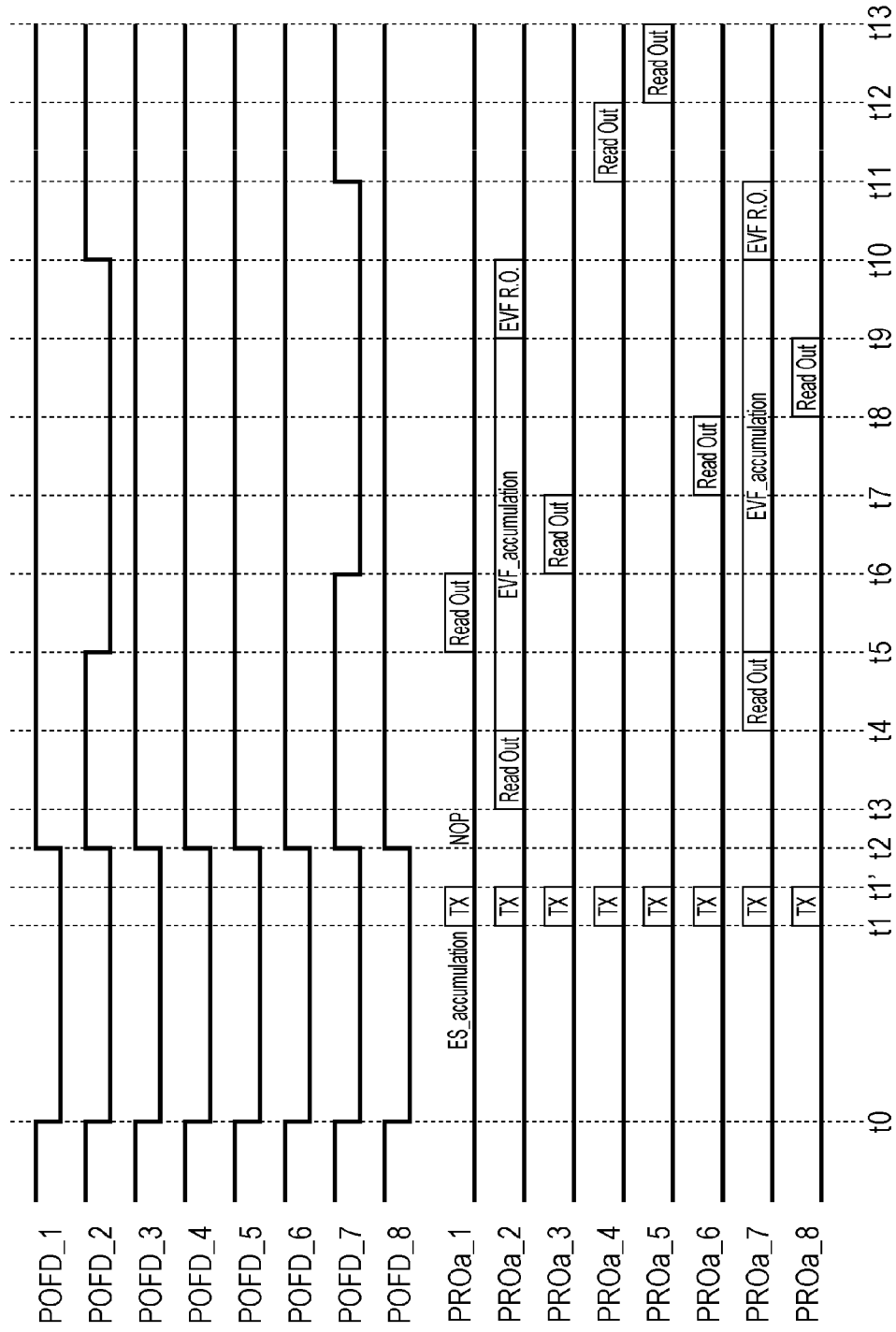
FIG. 13 is a diagram illustrating an operation sequence according to a fifth embodiment.

A fifth embodiment will be described with reference to FIG. 13. In this embodiment, pixels PIX have the configuration illustrated in FIG. 2.

Points different from the operation sequence illustrated in FIG. 3 will be mainly described.

In the operation illustrated in FIG. 3, among the pixels in the eight rows, signals are read from the pixels in the first to fourth rows and the seventh row in the first frame and signals are read from the pixels in the second row and the fifth to eighth rows in the second frame. However, in this embodiment, in a first frame, in addition to pixels in second and seventh rows, signals are read from pixels in rows which are adjacent to the second and seventh rows. Furthermore, in a second frame following the first frame, in addition to the pixels in the second and seventh rows, signals are read from pixels in fourth and fifth rows.

Advantages of this operation sequence will be described. In the pixels in the second and seventh rows, after signals are read in the first frame, accumulating operations are performed for the next frame. Specifically, signals POFD_2 and POFD_7 are set to low levels. Therefore, if light quantity is large, electric charges generated in photoelectric conversion units PD may flow into adjacent pixels. As an interval between a period TX and a period Read Out becomes larger, pixels in the rows adjacent to the pixels in the second and seventh rows are considerably affected by the electric charges which flow from the pixels in the second and seventh rows, and accordingly, image quality is deteriorated. Therefore, in this embodiment, signals are also read from pixels which are adjacent to the pixels in the second and seventh rows so that the deterioration of the image quality is suppressed.

This embodiment is generalized as below. Signals obtained from a plurality of pixels in the same accumulation periods are read for a plurality of frames, and when signals are read from pixels in certain rows every frame, signals are read from pixels in rows adjacent to the pixels in the certain rows before signals are read from pixels in rows which are not adjacent to the pixels in the certain rows. Furthermore, photoelectric conversion units in the pixels in the rows other than the certain rows are brought to reset states, and accordingly, blooming is suppressed.

Furthermore, it is not necessarily the case that signals are read from all the pixels adjacent to the pixels in the certain rows corresponding to a high updating speed in one frame. For example, in the operation illustrated in FIG. 13, signals may be read only from pixels in first and sixth rows in the first frame, and signals may be read from pixels in third and eighth rows in the next frame. Also in this case, those signals are read before signals are read from the pixels in the rows which are not adjacent to the certain rows described above.

According to the foregoing embodiments, the case where, among the pixels in the eight rows, signals are read from pixels in two rows in a cycle shorter than a cycle for reading signals from pixels in the other rows has been described. However, the disclosure is not limited to this.

Sixth Embodiment

A sixth embodiment will now be described.

Figure 14:
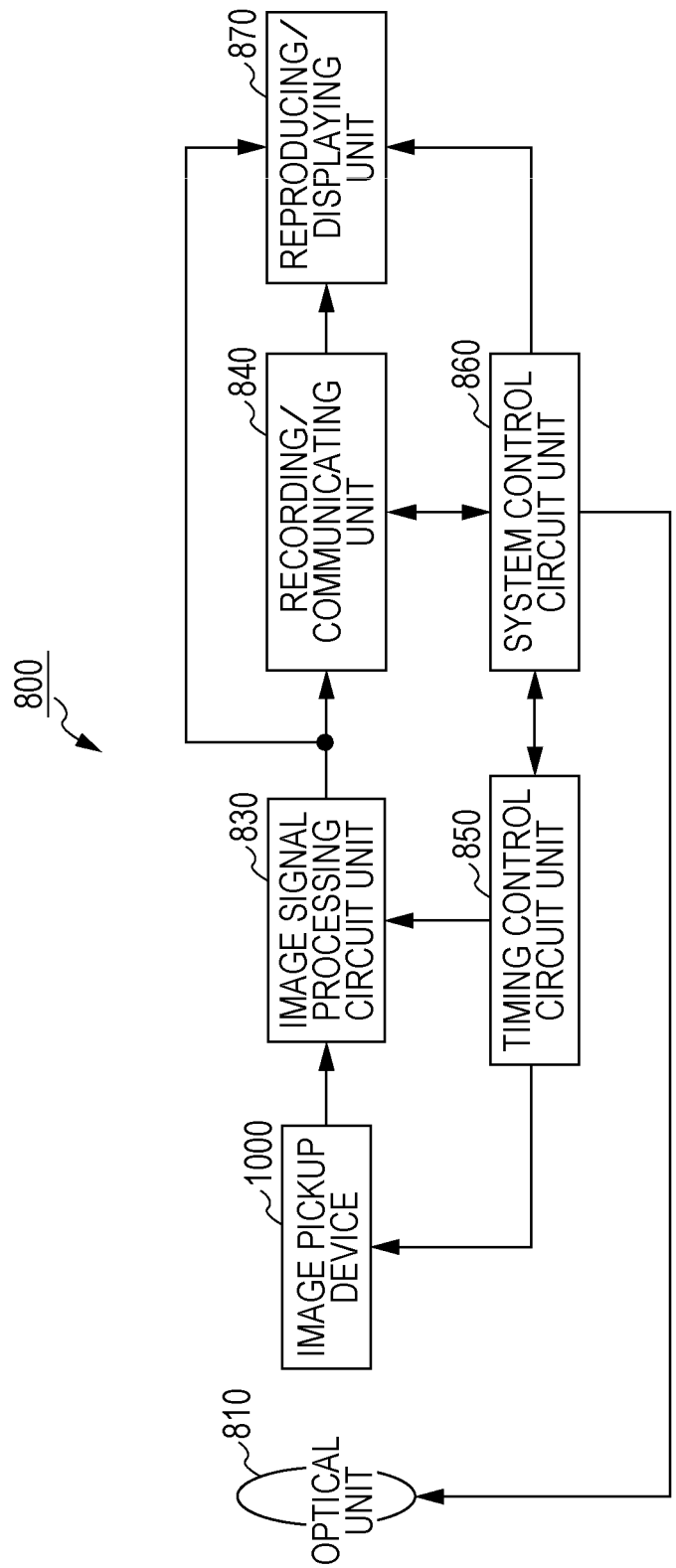
FIG. 14 is a block diagram illustrating an image pickup system according to a sixth embodiment.

An image pickup system according to this embodiment will be schematically described with reference to FIG. 14.

An image pickup system 800 includes an optical unit 810, an image pickup device 1000, an image signal processing circuit unit 830, a recording/communicating unit 840, a timing control circuit unit 850, a system control circuit unit 860, and a reproducing/displaying unit 870. As the image pickup device 1000, the photoelectric conversion device 1 described in the foregoing embodiments is used. Here, a case where the controller 3 illustrated in FIG. 1 is included in the timing control circuit unit 850 instead of the image pickup device 1000 is illustrated.

The optical unit 810 which is an optical system such as a lens forms an image of an object on a pixel array in which a plurality of pixels are arranged in a matrix included in the image pickup device 1000 using light of the object. The image pickup device 1000 outputs signals corresponding to the light which forms the image on a pixel unit at a timing based on a signal supplied from the timing control circuit unit 850.

The signals output from the image pickup device 1000 are supplied to the image signal processing circuit unit 830 serving as an image signal processor which performs a certain process such as an AD conversion on the supplied electric signals in accordance with a method prescribed by a program or the like. The signals obtained by the process performed by the image signal processing circuit unit 830 are supplied to the recording/communicating unit 840 as image data. The recording/communicating unit 840 supplies a signal used to form an image to the reproducing/displaying unit 870 which reproduces and displays a moving image or a still image. Furthermore, the recording/communicating unit 840 receives the signals supplied from the image signal processing circuit unit 830 so as to communicate with the system control circuit unit 860, and in addition, the recording/communicating unit 840 performs an operation of recording the signals used to form an image in a recording medium, not shown.

The system control circuit unit 860 integrally controls operation of the image pickup system and controls driving of the optical unit 810, the timing control circuit unit 850, the recording/communicating unit 840, and the reproducing/displaying unit 870. Furthermore, the system control circuit unit 860 includes a storage device, not shown, which is a recording medium, for example, which stores programs used to control the operation of the image pickup system. Furthermore, the system control circuit unit 860 supplies a signal used to switch driving modes in accordance with a user's operation, for example, in the image pickup system. Examples of the user's operation include change of rows to be subjected to reading or resetting, change of a field angle caused by adjustment of an electronic zoom, shift of the field angle for image stabilizing, and the like.

The timing control circuit unit 850 controls driving timings of the image pickup device 1000 and the image signal processing circuit unit 830 under control of the system control circuit unit 860 serving as a controller.

The image signal processing circuit unit 830 stores the correction coefficient described in the foregoing embodiments and performs a correction process on a signal output from the image pickup device 1000.

The image pickup system may further include a sensor for detecting light quantity. For example, the system control circuit unit 860 may change the operation of the photoelectric conversion apparatus 1 in accordance with the light quantity detected by the light quantity detection sensor.

The foregoing embodiments are merely examples for describing the disclosure, and various modifications and combinations may be made without departing from the scope of the disclosure.

One disclosed feature of the embodiments may be described as a process which is usually depicted as a timing diagram. A timing diagram may illustrate the timing relationships of several entities, such as signals, events, etc. Although a timing diagram may describe the operations as a sequential process, some operations may be performed in parallel or concurrently. In addition, unless specifically stated, the order of the operations or timing instants may be re-arranged. Furthermore, the timing or temporal distances may not be scaled or depict the timing relationships in exact proportions.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A method for driving a photoelectric conversion device which includes a plurality of pixels, each of the plurality of pixels including a photoelectric conversion unit and a holding unit configured to hold electric charges, the method comprising:
    transferring charges of the photoelectric conversion unit to the holding unit in a pixel in such a manner that the transfer is performed simultaneously for each of the plurality of pixels; and
    performing, during a period in which a signal is read out based on electric charges transferred in the transferring, signal accumulation for a part of the plurality of pixels;
    wherein, during a period in which the signal accumulation is performed for the part of the plurality of pixels, electric charges of a photoelectric conversion unit are discharged for each of pixels other than, among the plurality of pixels, the part of the plurality of pixels.

2. The method according to claim 1, wherein the holding unit is a floating diffusion unit.

3. The method according to claim 1, wherein the holding unit is a storage capacitor disposed between the photoelectric conversion unit and the floating diffusion unit.

4. The method according to claim 1, further comprising:
    forming a moving image using signals of the part of the plurality of pixels and a still image using both the signals of the part of the plurality of pixels and signals of the pixels, among the plurality of pixels, other than the part of the plurality of pixels.

5. The method according to claim 1, wherein the part of the plurality of pixels includes pixels arranged in a plurality of pixel rows and accumulation periods of the plurality of pixel rows are different from one another.

6. The method according to claim 1, wherein the part of the plurality of pixels includes pixels arranged in a plurality of pixel rows and accumulation periods of the plurality of pixel rows are identical.

* * * * *